United States Patent
Good

(10) Patent No.: US 7,587,080 B1
(45) Date of Patent: Sep. 8, 2009

(54) IMAGE RETENTION USER INTERFACE

(75) Inventor: John M. Good, North Andover, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 11/191,123

(22) Filed: Jul. 27, 2005

Related U.S. Application Data

(60) Provisional application No. 60/624,935, filed on Nov. 4, 2004.

(51) Int. Cl.
*G06K 9/00* (2006.01)
*H04N 7/18* (2006.01)

(52) U.S. Cl. .................................. 382/141; 348/86

(58) Field of Classification Search ............... None
See application file for complete search history.

(56) References Cited

U.S. PATENT DOCUMENTS

| | | | |
|---|---|---|---|
| 4,750,044 A | 6/1988 | Nakajima | |
| 5,751,345 A | 5/1998 | Dozier et al. | |
| 5,841,893 A * | 11/1998 | Ishikawa et al. | 382/145 |
| 6,185,324 B1 * | 2/2001 | Ishihara et al. | 382/149 |
| 6,373,054 B2 | 4/2002 | Hiroi et al. | |
| 6,496,206 B1 | 12/2002 | Mernyk et al. | |
| 6,531,707 B1 * | 3/2003 | Favreau et al. | 250/559.46 |
| 6,535,776 B1 * | 3/2003 | Tobin et al. | 700/110 |
| 6,597,381 B1 * | 7/2003 | Eskridge et al. | 715/804 |
| 6,611,728 B1 | 8/2003 | Morioka et al. | |
| 6,614,453 B1 * | 9/2003 | Suri et al. | 715/764 |
| 6,681,038 B2 * | 1/2004 | Vilella | 382/145 |
| 6,686,959 B1 | 2/2004 | Ducourant et al. | |
| 6,717,142 B2 | 4/2004 | Hiroi et al. | |
| 6,828,554 B2 | 12/2004 | Hiroi et al. | |
| 6,855,929 B2 | 2/2005 | Kimba et al. | |
| 6,870,547 B1 | 3/2005 | Crosby et al. | |
| 6,958,683 B2 | 10/2005 | Mills et al. | |
| 6,973,209 B2 * | 12/2005 | Tanaka | 382/149 |
| 2001/0002697 A1 | 6/2001 | Hiroi et al. | |
| 2002/0000998 A1 * | 1/2002 | Scott et al. | 345/667 |
| 2002/0009220 A1 * | 1/2002 | Tanaka | 382/145 |
| 2002/0040257 A1 | 4/2002 | Baumgartner et al. | |
| 2002/0051565 A1 * | 5/2002 | Hiroi et al. | 382/149 |
| 2002/0055947 A1 * | 5/2002 | Schultz et al. | 707/500 |
| 2002/0059265 A1 * | 5/2002 | Valorose, III | 707/100 |
| 2002/0100872 A1 | 8/2002 | Hiroi et al. | |
| 2002/0109721 A1 * | 8/2002 | Konaka et al. | 345/762 |
| 2002/0122582 A1 * | 9/2002 | Masuda et al. | 382/141 |
| 2002/0141632 A1 * | 10/2002 | Engelbart et al. | 382/141 |
| 2003/0018405 A1 | 1/2003 | Walacavage et al. | |
| 2003/0058444 A1 * | 3/2003 | Nara et al. | 356/394 |

(Continued)

*Primary Examiner*—Charles Kim
(74) *Attorney, Agent, or Firm*—Turocy & Watson, LLP; William R. Walbrun

(57) ABSTRACT

The present invention provides a system and/or method that facilitates inspecting and/or measuring within manufacturing lines by employing an image retention user interface that displays a failed image from a low end vision system. The image retention user interface can display at least one thumbnail associated to a failed image wherein the failed image can be annotated indicating a failure. Furthermore, the image retention user interface can provide adjustments to equipment related to a low end vision system and/or manufacturing lines. The image retention user interface can also utilize editing techniques to edit failed images. Additionally, the image retention user interface transmits the failed images to a remote system and/or location.

30 Claims, 11 Drawing Sheets

U.S. PATENT DOCUMENTS

| | | | |
|---|---|---|---|
| 2003/0156749 A1* | 8/2003 | Nishiura et al. | 382/149 |
| 2003/0167238 A1* | 9/2003 | Zeif | 705/400 |
| 2004/0090471 A1* | 5/2004 | Cone et al. | 345/853 |
| 2004/0164244 A1 | 8/2004 | Hiroi et al. | |
| 2004/0199897 A1* | 10/2004 | Ghercioiu et al. | 717/101 |
| 2004/0240005 A1 | 12/2004 | Kim | |
| 2005/0082476 A1 | 4/2005 | Hiroi et al. | |
| 2005/0091287 A1* | 4/2005 | Sedlar | 707/200 |
| 2005/0121296 A1* | 6/2005 | Haan et al. | 198/780 |
| 2005/0121611 A1 | 6/2005 | Kimba et al. | |
| 2005/0172018 A1* | 8/2005 | Devine et al. | 709/223 |
| 2005/0196059 A1 | 9/2005 | Inoue et al. | |
| 2005/0210414 A1* | 9/2005 | Angiulo et al. | 715/838 |
| 2005/0230618 A1 | 10/2005 | Onishi et al. | |
| 2007/0070336 A1* | 3/2007 | Maeda et al. | 356/237.2 |
| 2007/0109534 A1* | 5/2007 | Shibata et al. | 356/237.5 |

* cited by examiner

IMAGE RETENTION USER INTERFACE

CROSS-REFERENCE TO RELATED APPLICATION(S)

This application claims the benefit of U.S. Provisional Patent Application Ser. No. 60/624,935 filed on Nov. 4, 2004, entitled "IMAGE RETENTION USER INTERFACE." The entirety of this application is incorporated herein by reference

TECHNICAL FIELD

The present invention generally relates to industrial control systems, and more particularly to vision sensors and/or low end vision systems within industrial manufacturing.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off) as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control as stated supra. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

In addition, conventional control systems employ a large array of varied technologies and/or devices to achieve automation of an industrial environment, such as a factory floor or a fabrication shop. Systems employed in an automated environment can utilize a plurality of sensors and feedback loops to direct a product through, for example, an automated assembly line. Such sensors can include temperature sensors (e.g., for determining a temperature of a steel bar that is entering a roller device to press the bar into a sheet . . . ), pressure sensors (e.g., for determining when a purge valve should be opened, for monitoring pressure in a hydraulic line . . . ), proximity sensors (e.g., for determining when an article of manufacture is present at a specific device and/or point of manufacture . . . ), etc.

Proximity sensors are available in a wide variety of configurations to meet a particular user's specific sensing needs. For example, sensors can be end-mounted in a housing, side-mounted in a housing, etc., to facilitate mounting in confined spaces while permitting the sensor to be directed toward a sensing region as deemed necessary by a designer. Additionally, proximity sensors are available with varied sensing ranges, and can be shielded or unshielded. Shielded inductive proximity sensors can be mounted flush with a surface and do not interfere with other inductive proximity sensors, but have diminished sensing range when compared with unshielded proximity sensors.

Various types of proximity sensors are used for detecting the presence or absence of an object. Common types of non-contact proximity sensors include inductive proximity sensors, capacitive proximity sensors, ultrasonic proximity sensors, and photoelectric sensors. Such sensors, for example, may be used in motion or position applications, conveyor system control applications, process control applications, robotic welding applications, machine control applications, liquid level detection applications, selecting and counting applications, as well as other known applications.

In a photoelectric sensor (e.g., optoelectronic sensory, and/or photocell), for example, basic optic functions can be utilized for common object detection (e.g., through beam, retroreflex, and proximity). In one example, a photoelectric sensor includes basic elements such as, for example, a photo-emitter, an optic system, a photo-receiver, a demodulator-amplifier, a comparator, and a transistor. The photo-emitter converts a modulated electric signal into luminous energy pulses that are distinct from other light sources. The photo-emitter and a receiver can be connected in an optic system by, for example, a light beam wherein variations are elaborated to detect an object. The received luminous energy is converted into an electronic signal by, for example, a photo-receiver. After the conversion, a demodulator-amplifier extracts and amplifies part of the signal originated by the modulated light emitter. The comparator can compare the received signal and a switching threshold. Furthermore, a transistor or relay power output drives an external actuator to direct the load.

However, there is a trend in industrial technology to replace traditional mechanical gauging or sensor technology with cost-saving, easy-to-use vision sensors. A single vision sensor can supersede measurement sensors, proximity, and photoelectric sensor arrays, and/or mechanical gauges in performing inspection /measurement. For example, a vision sensor can be, but not limited to, a low end vision system, a vision camera, camera sensor, and/or smart camera. General benefits of vision sensors over traditional mechanical gauging and sensor technology include lower costs for installation, calibration, and maintenance; online accessibility to add new inspections and/or measurement capabilities; quality and efficiency; and improved functionality.

Typically, vision sensors are available in two hardware configurations—an all-in-one "smart camera" or a remote camera. The smart camera is a standalone unit where a light source, lens, camera, and processor/controller are in a single package. In contrast, the remote camera is a separate unit containing a remote camera, lens, and light source while an associated processor/controller is separately contained. The smart camera can act as a standalone unit with I/O or communication outputs and give a slight increase in speed in comparison to the remote camera based upon a lack of cable transmission for the processor/controller; however, the remote camera is more compact and can locate I/O wiring in a controller housing separate from the remote camera.

Furthermore, each hardware configuration provides associated software in order to mitigate setup and configuration costs and inefficiencies. Traditional software utilizes a pushbutton interface in order to "teach" a sensor bad and/or good machined parts, thereby allowing self-contained configuration. For example, the pushbutton interface is utilized to teach the vision sensor pattern matching, presence/absence of a pattern, and/or feature comparison, wherein the pushbutton designates a "perfect model" to which a pass or fail judgment is made. Another self-contained configuration mode utilizes a drop-down menu or interface, thereby allowing customized configuration capability for individual settings or changes tailored to each measurement and/or inspection. Regardless of the configuration mode and/or interface chosen, pass or fail determinations are simply binary without extrinsic or correlated data.

In view of the above, there is a need to improve upon and/or provide systems and/or methods relating to vision sensors and associated low end vision systems that facilitate inspecting and/or measuring within industrial manufacturing applications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate inspecting machined parts created via manufacturing lines by employing an image retention user interface that displays a failed image. The image retention user interface can receive a failed image from a low end vision system that utilizes image retention. The received failed image can contain an annotation that indicates where an image failed, wherein the annotation is in a textual and/or pictorial form. Moreover, the image retention user interface can display a thumbnail associated with a failed image to facilitate viewing a plurality of failed images. In accordance with one aspect of the subject invention, the failed images can be formatted into a suitable format for display upon the image retention user interface.

In accordance with another aspect of the subject invention, the image retention user interface allows the user to adjust equipment based upon received failed images that are displayed. The adjustment and/or correction to equipment can be related to the manufacturing line and/or the low end vision system. Moreover, the image retention user interface can utilize editing techniques in order to edit a failed image. Traditional photo-editing techniques (e.g., fill, pencil, brush, crop, cut, trim, rotate, stretch, zoom, insert, airbrush, blur, sharpen, contrast, brightness, erase, text, resolution, . . . ) facilitate editing a failed image as well as relaying information to another user and/or another system.

In accordance with yet another aspect of the subject invention, the image retention user interface can be integrated into a vision sensor within the low end vision system. Moreover, a direct connection (e.g., hardwire, LAN cable, Firewire, USB cable, serial cable, . . . ) can be utilized in order to receive the failed image data. The image retention user interface can also receive the failed image data via a wireless connection (e.g., Bluetooth, radio frequency, infrared, wireless LAN, wireless PAN, optical, cellular, . . . ). In another example, the image retention user interface can transmit (e.g., email, wireless, Internet, network, LAN, WAN, Bluetooth, . . . ) to a remote system (e.g., a cell phone, email account, computer, pager, wireless device, a different image retention user interface, . . . ) failed and/or edited images. The transmission can be through a wireless connection and/or a direct connection.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
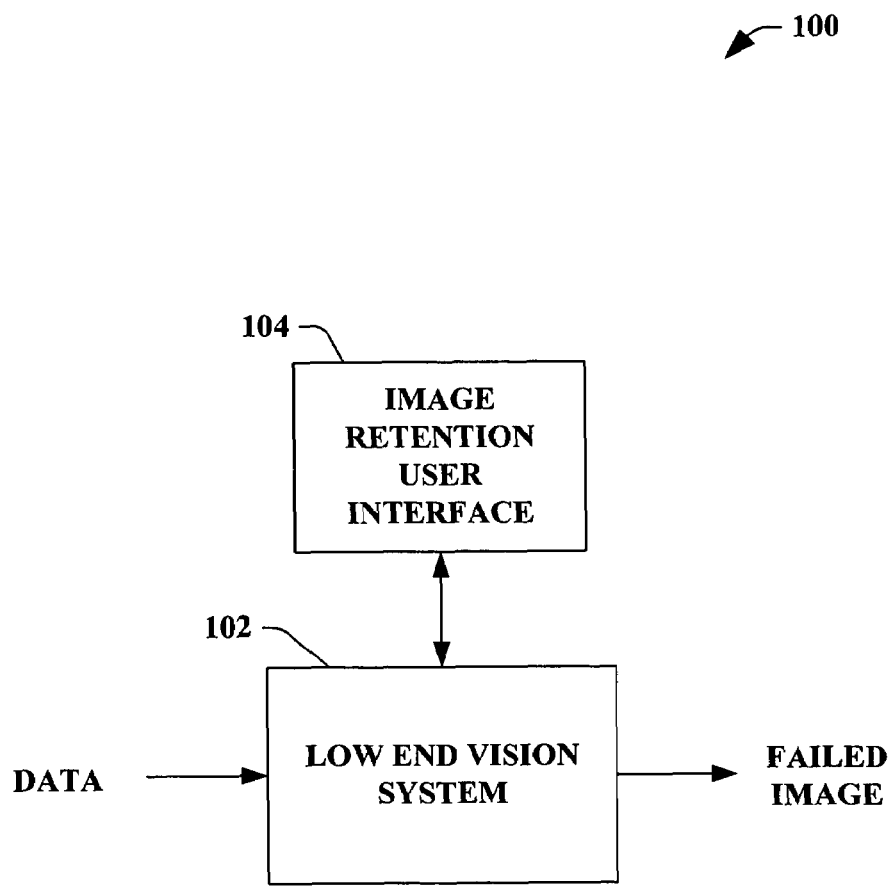
FIG. 1 illustrates a block diagram of an exemplary system that facilitates measuring and/or inspecting within an industrial manufacturing environment via a user interface.

The subject invention relates to systems and methods that facilitate inspecting and/or measuring within a manufacturing environment by employing an image retention user interface that presents images from a low end vision system to a user. The subject invention is described with reference to the drawings, wherein like reference numerals are used to refer to like elements throughout. In the following description, for purposes of explanation, numerous specific details are set forth in order to provide a thorough understanding of the present invention. It may be evident, however, that the subject invention may be practiced without these specific details. In other instances, well-known structures and devices are shown in block diagram form in order to facilitate describing the subject invention.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as described herein. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Now turning to the figures, FIG. 1 illustrates a system 100 that employs an image retention user interface 104 to present and display data (e.g., an image) from a low end vision system 102 to a user. The low end vision system 102 can utilize image retention to capture data relating to a manufacturing line wherein such data can be, for example, an image. Such data captured from low end vision systems provide accurate measurements and inspections within manufacturing lines. Moreover, captured data can be a failed image. Within vision sensor systems, binary analysis determines whether a captured image passes or fails based at least in part upon a comparison to a reference image. If the captured image is not substantially similar to the reference image, the captured image fails and is considered a failed image. However, within a low end vision system 102, such failed images are stored within memory (e.g., sensor memory, and/or transmitted to remote memory).

Once the data is captured, appropriate formatting is initialized to accurately display the data to the image retention user interface 104. For example, a failed image can be captured and stored by a low end vision system 102, wherein such failed image is formatted into JPEG format. It is to be appreciated that formatting a failed image is not limited to JPEG, but rather any suitable format (e.g., BMP, GIF, PDF, TIF, PSD, . . . ) can be utilized in connection with the subject invention. The formatted image is displayed to a user on the image retention user interface 104. In order to provide efficient presentation of data, the image retention user interface 104 can display a thumbnail and/or a plurality of thumbnails of each captured failed image received by the low end vision system 102. For example, the image retention user interface 104 can provide personalized display wherein thumbnails are presented individually or in multiples. Moreover, upon selecting a thumbnail, the image retention user interface 104 displays a larger view of the image, wherein such image can be associated with a higher resolution.

It is to be appreciated that the image retention user interface 104 can be any suitable interface including at least a display, a component associated with data receiving capabilities, memory, and/or inputs. In order to receive a failed image, the image retention user interface 104 can utilize a direct connection with the low end vision system 102, and/or a wireless connection. For instance, the low end vision system 102 can utilize a LAN network in order to communicate with the image retention user interface 104. The image retention user interface can be, but not limited to, a laptop, hand held display, portable digital assistant (PDA), cell phone, Blackberry, tablet PC, etc. Furthermore, the image retention user interface 104 can transmit the data captured from the low end vision system 102 to a remote system and/or terminal. In one example, the image retention user interface 104 can transmit the failed image via email, wireless or wired network (e.g., Internet, LAN, WAN, Bluetooth, . . . ) to a remote system such as a cell phone, email account, computer, pager, wireless device, a different image retention user interface, etc.

In accordance with one aspect of the subject invention, the failed image displayed by the image retention user interface 104 includes an annotation associated with one or more causes of failure. For instance, the low end vision system 102 can provide a failed image such that an annotation explains where a particular image had failed. In a more specific example, an image can be considered a failed image if the comparison to a reference image is below a defined threshold. The comparison fails if, for instance, a label is disoriented from a particular axis. When the low end vision system 102 captures data that has a label positioned in a disoriented manner, the low end vision system 102 can save the image as a failed image. In addition to saving the failed image, an annotation can be added such that an explanation is provided on where the image failed. Following this example, the annotation can be textual and/or highlighted sections of the failed image to indicate causes and/or location of the failure.

In accordance with another aspect of the subject invention, the image retention user interface 104 can edit the failed images. The low end vision system with image retention 102 can capture data wherein the data is a failed image containing at least an image that failed based at least partially upon a comparison to a reference image. It is to be appreciated the failed image can be formatted by either the low end vision system 102 or the image retention user interface 104 such that the failed image is displayed to a user. Additionally, the failed image can be annotated such that an explanation of failure is provided by either descriptive text or pictorial emphasis (e.g., highlight, bold, circled, . . . ).

In one example, the image retention user interface 104 can receive multiple failed images from a low end vision system 102. Utilizing the image retention user interface 104, thumbnails are displayed thereupon in which a user can select a thumbnail in order to get a larger view of the selected failed image. As stated supra, the failed images can be annotated such that an explanation of failure is provided. However, a user can additionally annotate and/or edit the failed images manually utilizing the image retention user interface 104. To annotate, the user can insert text either clarifying annotation or furthering annotation. Moreover, editing failed images allows a user to manipulate the image utilizing, for example, digital photography editing techniques (e.g., fill, pencil, brush, crop, cut, trim, rotate, stretch, zoom, insert, airbrush, blur, sharpen, contrast, brightness, erase, text, resolution, . . . ). It is to be appreciated the image retention user interface 104 can utilize a plurality of editing techniques and/or software in order to edit the failed image.

In accordance with another aspect of the subject invention, the image retention user interface 104 allows a user to correct and/or adjust equipment. It is to be appreciated the equipment can be associated with the low end vision system 102 and/or equipment associated with a manufacturing line. A received failed image on the image retention user interface 104 informs users that the low end vision system 102 has detected an inconsistency with a reference object. Once a user examines the failed images as thumbnails and/or large failed images, the user can determine an adjustment and/or correction in regards to the equipment within the low end vision system 102 and/or manufacturing industrial line. Utilizing various options, the equipment within the low end vision system 102 and/or manufacturing line can be corrected such that a particular failure does not lead to a failed image. For instance, a failed image can be based in part upon a low end vision system 102 with a substantial level of brightness. This brightness can be a cause of captured data not passing the comparison to a reference object. A user can utilize an image retention user interface 104, which allows the failed images to be viewed. As the user examines the failed images, a determination can be made that brightness is the cause of the failed images. Thus, utilizing the image retention user interface 104, the user can lower the brightness (e.g., light source intensity).

Figure 2:
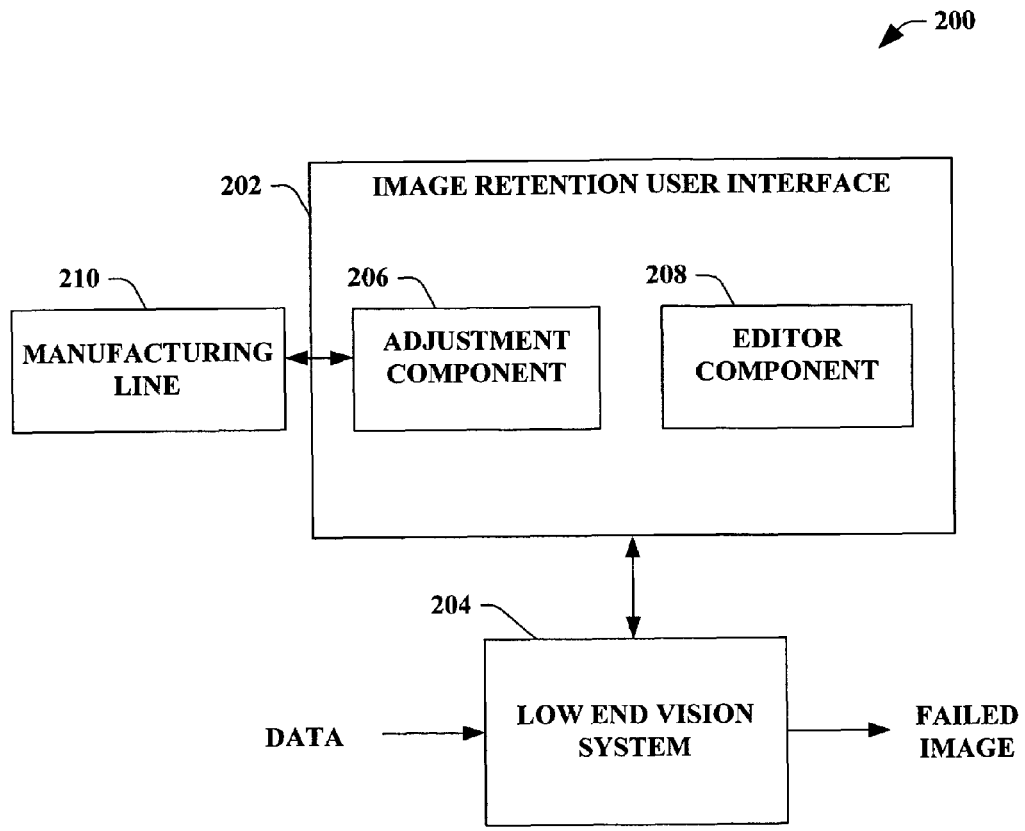
FIG. 2 illustrates a block diagram of an exemplary system that facilitates measuring and/or inspecting within industrial manufacturing utilizing a user interface.

FIG. 2 illustrates a system 200 that facilitates inspecting and/or measuring of products/parts associated with a manufacturing line. The system 200 employs an image retention user interface 202 that presents at least one failed image received from a low end vision system 204. The low end vision system can capture data via employing image retention techniques. For instance, the captured data can be an image that is compared to a reference image. Based at least in part upon the comparison with the reference image, the image is either passed (e.g., meeting defined requirements and/or thresholds) or failed (e.g., failing to meet the defined requirements and/or thresholds). The low end vision system 204 utilizes image retention and stores such failed images, thus allowing the image retention user interface 202 to receive and display failed images to a user. The low end vision system 204 provides formatting capabilities such that computation costs associated with presenting the images to a display is mitigated. For instance, the failed images and/or captured data can be formatted in a JPG, BMP, GIF, PDF, TIF, etc. In addition to the failed image captured by the low end vision system 204, the image can be annotated such that the failure can be explained and/or located.

The image retention user interface 202 displays the captured data (e.g., failed images) from the low end vision system 204. The failed images can be, for example, displayed as thumbnails on a display (not shown) on the image retention user interface 202. In one aspect in accordance with the subject invention, a plurality of thumbnails of the failed images is displayed to a user, wherein the user can display a larger view of a selected individual thumbnail. It is to be appreciated the image retention user interface 202 can support various file formats for the failed image from the low end vision system 204 that utilizes image retention. Thus, thumbnails can be displayed utilizing a particular format and/or multiple formats. In one example, the image retention user interface 202 can display thumbnails of failed images formatted as JPEGs. However, the thumbnails can also be displayed wherein the failed images a mixture of JPG, BMP, TIF, GIF, PDF, etc.

In order to present a failed image to a user, the image retention user interface 202 can be associated with a display, memory, and/or a receiver. It is to be appreciated the image retention user interface 202 can be any suitable device capable of receiving an image and displaying such image. For example, the image retention user interface 202 can be, but not limited to, a laptop, handheld, cell phone, portable digital assistant (PDA), monitor with touch-screen technology, pager, wrist watch, portable gaming system, etc. Additionally, the image retention user interface 202 can receive failed images from the low end vision system 204 by utilizing a wireless connection (e.g., Bluetooth, radio frequency, infrared, wireless LAN, wireless PAN, optical, cellular . . . ) and/or direct connection (e.g., hardwire, LAN cable, Firewire, USB cable, serial cable, . . . ).

The image retention user interface 202 can further include an adjustment component 206 that provides the user options to correct and/or adjust equipment within the low end vision system 204. By viewing the failed images on the image retention user interface 202, a user can extrapolate determinations for the image failing the comparison to a reference image. Based at least in part on the determination, the adjustment component 206 allows corrections and/or adjustments to be made to the equipment associated with capturing the failed image (e.g., the low end vision system 204). It is to be appreciated that the adjustment component 206 can perform real-time adjustments and/or corrections to equipment.

In one example, the image retention user interface 202 can receive a failed image such that a user determines failure is based upon an improper focusing of a lens within a low end vision system 204. Therefore, the adjustment component provides configuration and/or settings to be adjusted (e.g., corrected) for the low end vision system equipment. In this example, the adjustment component 206 adjusts the lens focus based upon a user preference and/or determination in order to correct the focus failure allowing such failed images to be reduced.

Moreover, the adjustment component 206 can correct and/or adjust equipment associated with a manufacturing line 210 in which the low end vision system 204 is monitoring and/or inspecting. For instance, the image retention user interface 202 can display failed images to a user. Upon examination, the user can conclude that a manufacturing line 210 is not stopping quick enough in order to allow the low end vision system 204 to capture data (e.g., a failed image). Thus, a blurring of the failed images is the reason for failure in comparison to a reference image. The adjustment component 206 enables the user to increase the deceleration rate for the specific industrial manufacturing line in order to correct the failed images relating to the blurring failure.

Furthermore, the image retention user interface 202 includes an editor component 208 allowing a user to edit a failed image. Once a failed image is displayed to a user on the image retention user interface 202, the user can edit such failed image accordingly. Allowing the user to edit such failed images facilitates informing another (e.g., supervisor, remote system, employees, . . . ) with problems and/or errors associated to equipment within industrial manufacturing lines. The editor component 208 utilizes typical photo-editing techniques for the failed images regardless of the format (e.g., BMP, JPG, TIF, PDF, GIF, . . . ). For instance, the editor component 208 utilizes editing techniques such as, but not limited to, fill, pencil, brush, crop, cut, trim, rotate, stretch, zoom, insert, airbrush, blur, sharpen, contrast, brightness, erase, text, resolution, burn, hue, etc. Upon any revisions and/or edits utilizing the editor component 208, the edited failed image can be saved into memory for further access/use.

In one example, the image retention user interface 202 can display thumbnails of a plurality of failed images. Upon selecting an individual failed image, the image retention user interface 202 allows the user to edit such failed image utilizing the editor component 208. By employing the editor component 208, the user can utilize digital photography editing techniques on the failed image. In a specific example, the user can add additional comments and/or emphasis to the failed image. The user can add text, circle, highlight, and/or bold any areas necessary. Thus, the user can enhance the failed image according to a user specification. Additionally, when the failed image is annotated as stated supra, additional text comments can be inserted. It is to be appreciated that various editing techniques can be utilized with the editor component 208.

Figure 3:
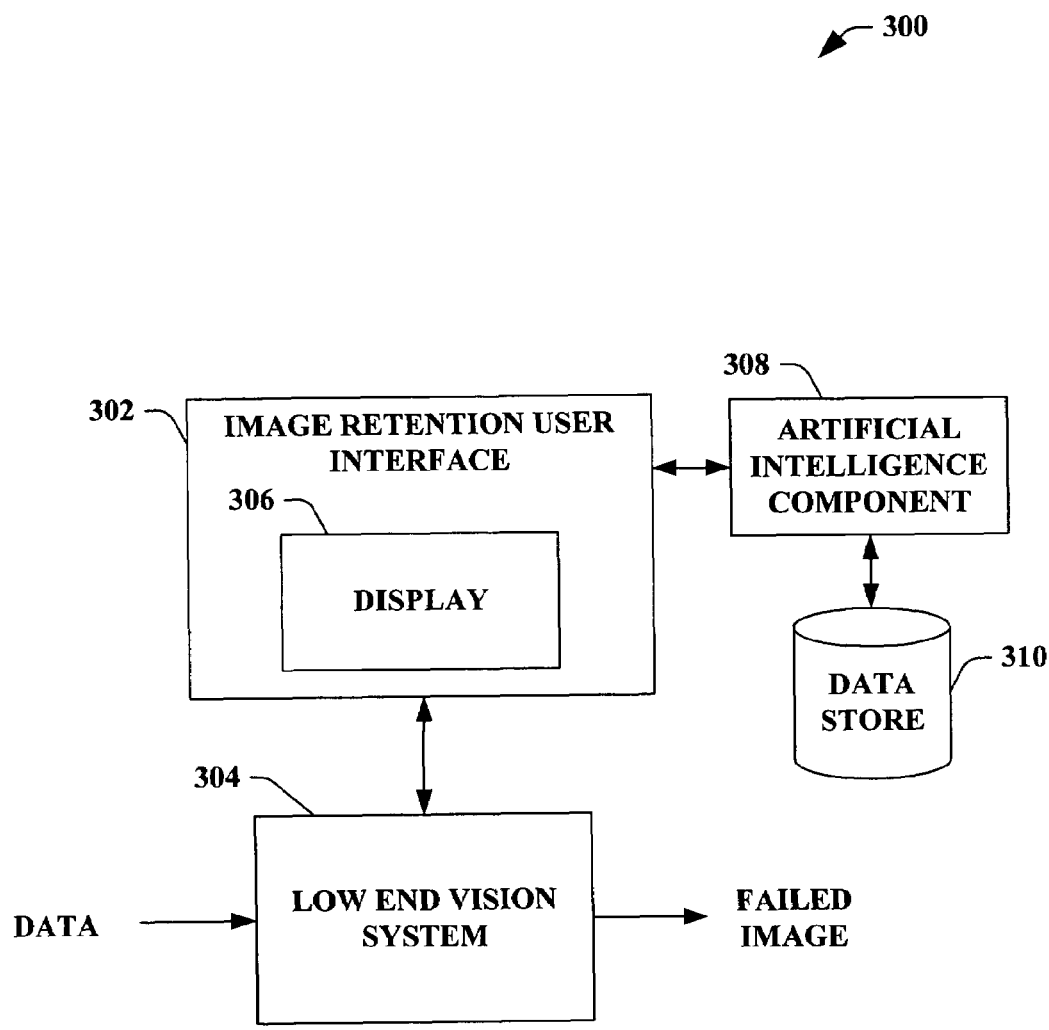
FIG. 3 illustrates a block diagram of an exemplary system that facilitates measuring and/or inspecting within industrial manufacturing utilizing a user interface.

FIG. 3 illustrates a system 300 that facilitates employing an image retention user interface 302 to display a failed image captured by a low end vision system 304. The low end vision system 304 can capture data from a manufacturing line wherein the captured data can be, for example, a failed image. The failed image is a rejected image saved by the low end vision system 304 when a comparison between the captured data and a reference image do not meet threshold requirements. After determining an image is a failed image, the image retention user interface 302 displays at least one failed image to a user. It is to be appreciated that the image retention user interface 302 can utilize thumbnails of a plurality of failed images to facilitate viewing such images on a display 306. For example, the display 306 can be, but not limited to, a computer monitor, liquid crystal display (LCD), television screen, touch screen, plasma monitor, digital display, analog display, high-definition display, etc. The display 306 provides a visual representation of the failed images received from the low end vision system 304 regardless of the format (e.g., JPG, BMP, TIF, GIF, PDF, . . . ).

The image retention user interface 304 further includes an artificial intelligence component 308 that infers settings and/or actions involving the interaction between the image retention user interface 302 and the low end vision system 304. By utilizing artificial intelligence, human error is mitigated and automation processes are optimized. In accordance with one aspect of the subject invention, the artificial intelligence component 308 can utilize user profiles and historic data in order to infer configurations and/or settings for the image retention user interface 304. Such historic data and profiles can be stored in a data store 310.

For instance, the artificial intelligence component 308 can generate inferences relating to formatting of a failed image displayed on an image retention user interface 302. Based upon historic data, user profile(s), and/or equipment utilized (e.g., user interface, low end vision equipment, software, processor, connection speed, . . . ), the artificial intelligence component 308 infers the optimal format for a failed image to be displayed upon the image retention user interface 302. In one example, a user utilizes an image retention user interface 302 wherein a wireless connection and a photo-editing component. The artificial intelligence component 308 infers the optimal format for displaying failed images on the image retention user interface 302. Thus, based on historic data, personal preferences within user profiles, and/or equipment failed image format (e.g., JPG, BMP, TIF, GIF, PDF, . . . ) is determined.

In accordance with another aspect of the subject invention, the artificial intelligence component 308 infers corrections/adjustments to equipment relating to manufacturing lines and/or associated low end vision system 304. The image retention user interface 302 allows equipment to be adjusted based on failed images. Based at least upon historic data regarding adjustments related to failed images, the artificial intelligence component 308 infers adjustments to equipment in order to correct a failure. In other words, after a repetitive failure relating to brightness, the artificial intelligence component 308 can determine a corrective brightness setting and implement such corrective measure utilizing the image retention user interface 302.

In yet another aspect in accordance with the subject invention, the artificial intelligence component 308 infers a plurality of interface layouts based at least upon historic data and/or a user profile. The artificial intelligence component 308 can determine a layout that is optimal to a specific user's taste. For instance, a layout can consist of various fonts (e.g., Times New Roman, Arial, . . . ), size (e.g., 10 pt, 12 pt, . . . ), windows (e.g., size, contents, color, . . . ), actions (e.g., single click, double click . . . ), . . . . Thus, the artificial intelligence component 308 infers various settings based at least upon a user profile and/or historic data.

Figure 4:
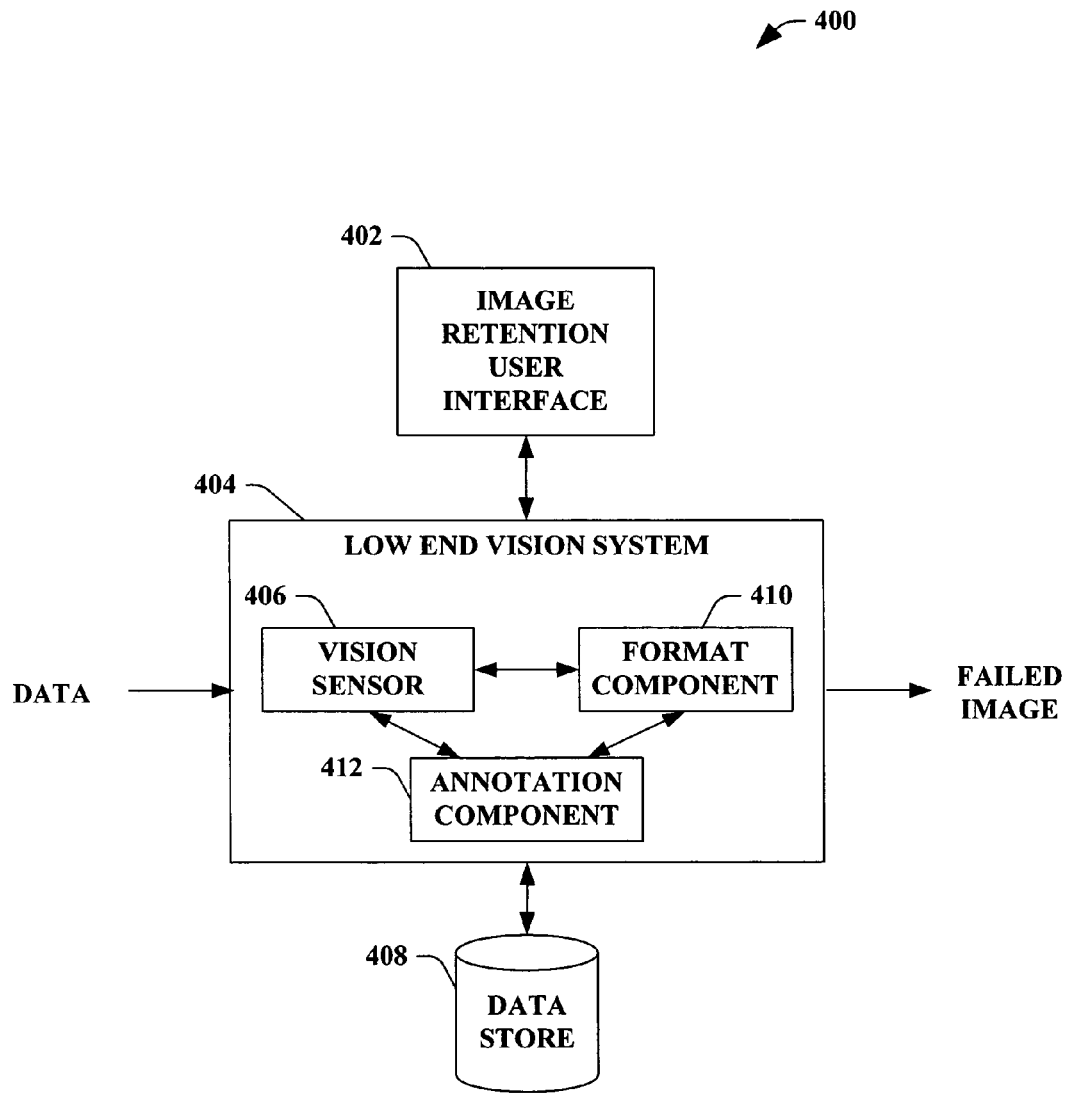
FIG. 4 illustrates a block diagram of an exemplary system that facilitates measuring and/or inspecting utilizing a user interface in conjunction with a low end vision system.

FIG. 4 illustrates a system 400 that utilizes an image retention user interface 402, which facilitates displaying a failed image captured by a low end vision system 404. The low end vision system 404 captures data from a manufacturing line utilizing a vision sensor 406. The vision sensor 406 captures images and determines whether or not there is a pass or a fail. For instance, a vision sensor is calibrated such that a reference image is stored and used for comparison to later-captured images. Thus, if the comparison between an image and the reference image are not within a set threshold, the image is said to be a failed image. Upon determining that an image is a failed image, the low end vision system can store failed image(s) in a data store 408 in order for later utilization by the low end vision system 404.

With the failed image captured, the image retention user interface 402 displays at least one failed image to a user. It is to be appreciated that the image retention user interface 402 can display one failed image and/or a plurality of images. For instance, based on user settings for the image retention user interface 402, thumbnails are utilized in order to display multiple failed images. Moreover, the image retention user interface 402 can display the failed images including annotations explaining any failures associated therewith. Furthermore, the annotations can be provided to a user audibly—thus, particular users with suboptimal vision need not strain their eyes to view annotations on an image. This audible annotation can be substantial and provide a user with precise reason(s) and/or causes of a failure of a captured image. The image retention user interface 402 can be any suitable interface capable of, at least, receiving and displaying a least one image. It is also to be appreciated that the image retention user interface 402 can receive a failed image by a direct connection and/or a wireless connection from the low end vision system 404.

The low end vision system 404 can further provide a format component 410 that formats data (e.g., a failed image) into a compatible format for displaying to a user. For example, the vision sensor can store the failed image in a first format, wherein the format component 410 can convert the failed image to a second format. The second format is more suitable for display to a user based upon, for example, size, available memory, display, resolution, etc. It is to be appreciated the format component 410 can be incorporated into the low end vision system 404 and/or in the image retention user interface 402. For instance, the image retention user interface 402 can utilize a Bitmap (BMP) format rather than a JPEG (JPG).

Thus, the image retention user interface 402 can utilize a format component to adaptively select a format and facilitate conversions between formats for display.

Furthermore, the low end vision system 404 can include an annotation component 412 that provides information with a failed image on where the particular image failed. The annotation component 412 facilitates inspecting and/or measuring within manufacturing lines by providing information on where a failure occurred on a failed image. For example, the vision sensor 406 captured images and compares such images to a reference image. When the two do not substantially correspond, the image can be labeled as a failed image. The annotation component 412 adds annotated information to the failed image providing details on the failure.

In one example, the annotation component 412 provides text to a failed image in order to illustrate a failure. The low end vision system 404 can determine a failed image and a reason for failure. Thus, the reason for failure can be included with the failed image with corresponding text in order to inform a user. In yet another example, the annotation component 412 utilizes emphasis techniques such as, but not limited to, bolding, highlighting, circling, boxing, etc. in order to emphasize a specific part or area containing a failure in the failed image.

Figure 5:
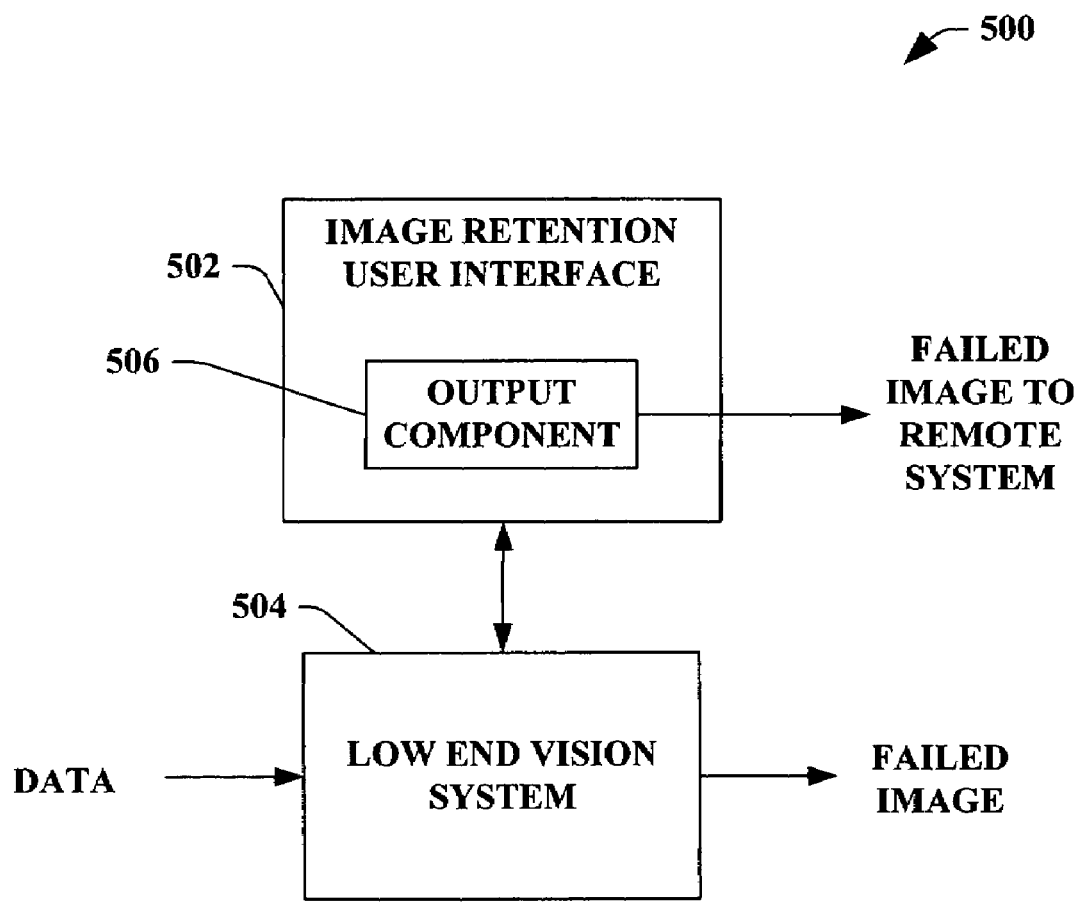
FIG. 5 illustrates a block diagram of an exemplary system that facilitates measuring and/or inspecting utilizing a user interface within manufacturing.

FIG. 5 illustrates a system 500 that facilitates inspecting and/or measuring parts on manufacturing lines by employing an image retention user interface 502 that displays and transmits a failed image. The low end vision system 504 determines whether captured data passes or fails according to a comparison. In one instance, the low end vision system 504 utilizes a reference image in order to compare data. In order to pass, the comparison with the reference image can be within a threshold (e.g., set by a user and/or based on historic data). If the comparison is not within the threshold, the image is considered a failed image. After determining whether captured data is a failed image, the low end vision system 504 can annotate according to the failure associated therewith.

The image retention user interface 502 receives at least one failed image from the low end vision system 504. It is to be appreciated the image retention user interface 502 can receive the failed image by a direct connection and/or a wireless connection. Furthermore, the image retention user interface 502 displays the at least one failed image in a particular format (e.g., JPG, BMP, TIF, GIF, PDF, . . . ). In accordance with one aspect of the subject invention, the image retention user interface utilizes thumbnail images of the received failed images in order to facilitate examining a plurality of failed images on a display. Moreover, the image retention user interface 502 can display images with annotation wherein such annotation explains where a failure occurred. In yet another aspect of the subject invention, the image retention user interface 502 allows editing of a failed image utilizing a plurality of photo-editing techniques.

The image retention user interface 502 further includes an output component 506 that transmits failed images to a remote location/system. The output component 506 can utilize a wireless connection (e.g., Bluetooth, radio frequency, infrared, wireless LAN, wireless PAN, optical, cellular) and/or a direct connection (e.g., hardwire, LAN cable, Firewire, USB cable, serial cable) in order to transmit at least one failed image to a remote location/system. For instance, the low end vision system 504 can capture a failed image wherein the image retention user interface 502 can receive and display such failed image. After viewing a failed image, the image retention user interface 502 transmits at least one image upon a user request. Thus, failed images are not limited to being viewed upon the image retention user interface 502 but rather can be sent to various remote locations/systems where failed image analysis can take place. A remote location/system can be, but not limited to, a cell phone, personal computer, pager, email account, web page, portable digital assistant (PDA), laptop, wrist watch, another image retention user interface, . . . . It is to be appreciated the image retention user interface 502 can transmit to any device capable of receiving and displaying a failed image.

Figure 6:
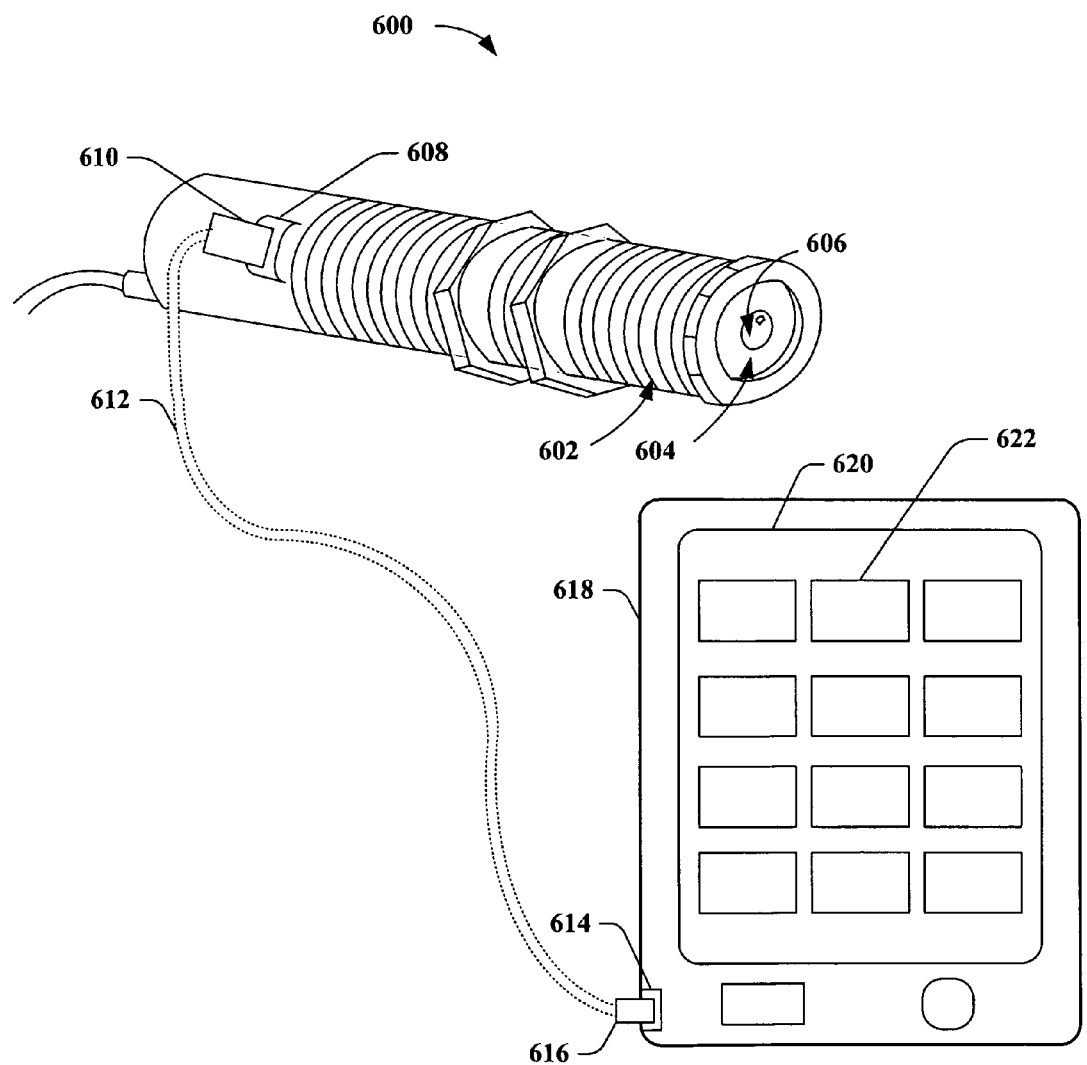
FIG. 6 illustrates a vision sensor and a user interface that facilitates measuring and/or inspecting within manufacturing.

FIG. 6 illustrates a system 600 that facilitates inspecting and/or measuring utilizing a vision sensor 602 and an image retention user interface 618 providing a display of failed images. The vision sensor 602 includes a lens 606 and a sensor head 604. By placing the vision sensor 602 such that the sensor head is directed toward an object, allowing data to be captured. It is to be appreciated various lenses can be utilized by the vision sensor 602. For instance, a zoom lens can be utilized as the lens 606 providing a close perspective and image for a manufacturing line.

Vision sensor 602 captures data (image data) wherein such data is determined to be pass or fail. For example, the vision sensor 602 can capture an image and utilize such image as a reference image. It is to be appreciated that the vision sensor 602 can store a failed image in a suitable format to be displayed such as, but not limited to JPG, BMP, TIF, GIF, PDF, . . . . Once stored, the vision sensor 602 can then capture data and compare such data with the reference object in order to determine a passed image or a failed image. The vision sensor 602 captured data and stores failed images to be displayed on the image retention user interface 618.

Furthermore, the vision sensor 602 can include additional components and/or equipment in order to annotate failed images such that the annotation informs of where a particular image failed. For instance, the failed image can be annotated such that when displayed on the image retention user interface 618, the user is informed by the annotation as to where the image failed. It is to be appreciated the annotation can be, but not limited to, a text and/or emphasis technique (e.g., highlight, circle, bold, square, box, shade, . . . ). Moreover, the vision sensor 602 provides storage for failed images either within self-contained and/or external memory wherein such failed images can be directly transferred to the image retention user interface 618. It is also to be appreciated the transfer of failed images to the image retention user interface 618 can be in real time, on delay, on timer, individual and/or in bulk.

The image retention user interface 618 displays failed images to a user to facilitate measuring and/or inspecting parts/objects on a manufacturing line. The image retention user interface 618 provides a display 620 wherein at least one failed image 622 is displayed to a user. The image retention user interface 618 utilizes thumbnail images such that a user can view a plurality of failed images mitigating time and screen space. It is to be appreciated the thumbnails and/or failed images can be formatted to a viewable format either by a low end vision system (not shown) and/or the image retention user interface 618. The failed images are received from the low end vision system (not shown) wherein a vision sensor captures data (e.g., a failed image).

In accordance with one aspect of the subject invention, the image retention user interface 618 can receive failed images from the vision sensor 602 through a direct connection 612. The direct connection can be, but not limited to, hardwire, LAN cable, Firewire, USB cable, serial cable . . . . It is to be appreciated the direct connection 612 can be any suitable connection in order to receive and/or transmit data. The direct connection 612 is utilized within system 600 such that data can be transferred from the vision sensor 602 and the image retention user interface 618. The direct connection 612 includes an import connector 616 and an export connector 610 that connects to the image retention user interface 618 and vision sensor 602 respectively. The image retention user interface 618 includes a data port 614 wherein the import connector 616 connects allowing images to be transferred to the image retention user interface 618. Moreover, the vision sensor 602 includes a data port 608 that allows a connection to be made with the direct connection 612 wherein images are provided for display on the image retention user interface 618.

In accordance with one aspect of the subject invention, the image retention user interface 618 can be integrated into the vision sensor 602. For example, the vision sensor 602 can provide an integrated display that can act as the image retention user interface 618. Thus, the sensor could be a standalone unit providing not only captured data (e.g., failed images) but also a display to view such failed images. It is to be appreciated the features and/or components (e.g., editor component, adjustment component, output component, . . . ) associated with the image retention user interface can be integrated into the vision sensor 602.

Figure 7:
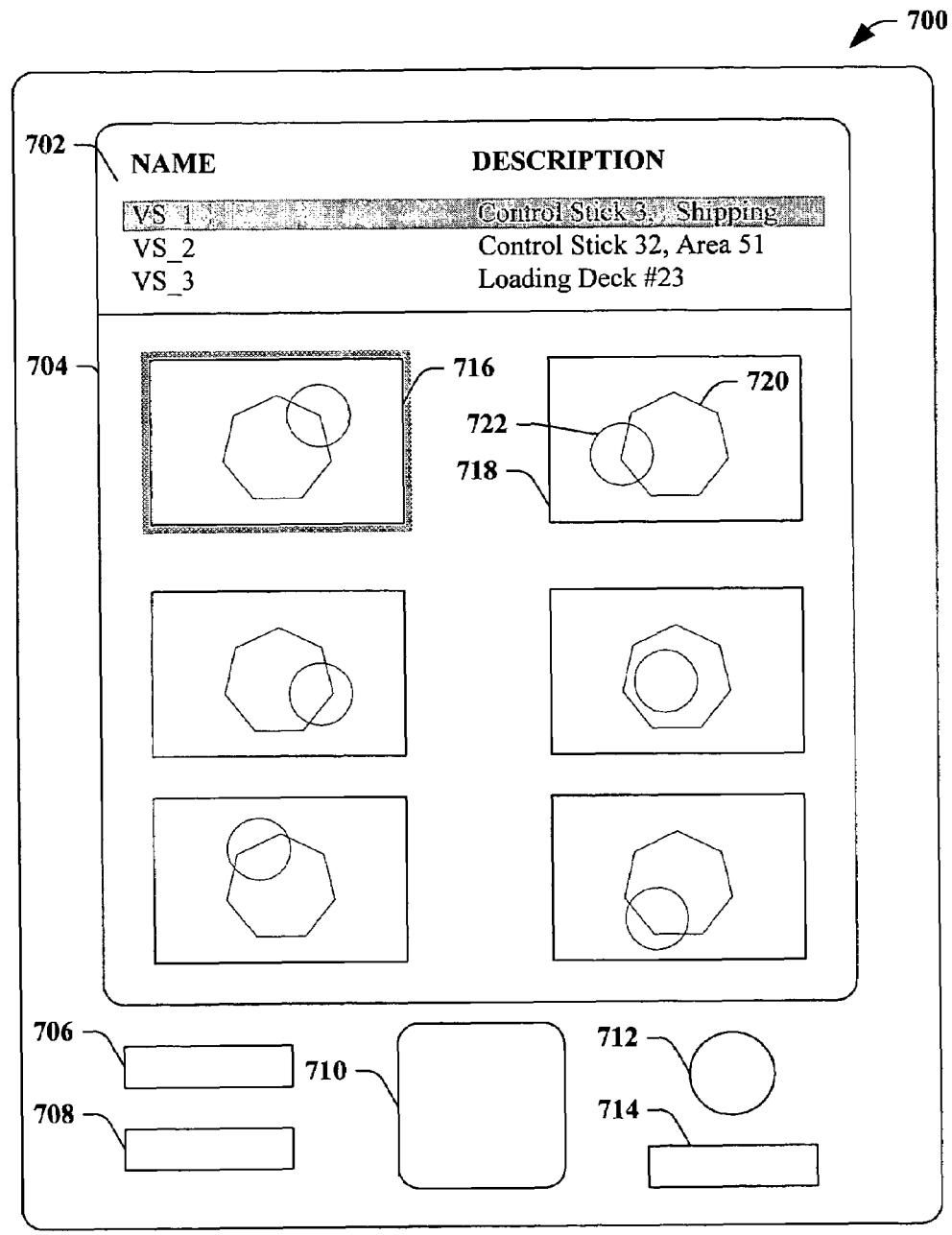
FIG. 7 illustrates a user interface that facilitates measuring and/or inspecting within manufacturing.

FIG. 7 illustrates an image retention user interface 700 that facilitates viewing data received from a low end vision system. The image retention user interface 700 includes a display 704 from which a user can view and/or manipulate received data (e.g., a failed image). The display 704 can be divided into sections according to, at least, personal preferences. An information section 702 includes a name and a description for a manufacturing line wherein vision sensors are utilized for inspection and measurements. The name is a network alias in order to reference a vision sensor and the description can be information related to such vision sensor. For instance, the name could be a numeric reference and the description can be a location. Moreover, within information section 704, a user can select a name (e.g., vision sensor) wherein at least one failed image from such name can be displayed. For example, the selection can be highlighted as depicted in FIG. 7. It is to be appreciated the image retention user interface 700 can receive the data from multiple low end vision systems via a direct connection and/or a wireless connection. Thus, a user can be within a wireless range allowing the image retention user interface to collect data to propagate to the display 704.

Selecting a name within information section 702 can display an associated failed image(s) in the manufacturing line. FIG. 7 illustrates a VS_1 (e.g., vision sensor 1) located at "Control Stick 3, Shipping" wherein six failed images are displayed to a user. The image retention user interface 700 displays thumbnails of the failed images allowing a user to select particular failed images for closer observation. For example, failed image 716 is selected indicated by highlight wherein the user can get a larger view (e.g., in proportion to the display 704). Examining the failed images closer, each failed image can contain an annotation describing where the failure occurred (e.g., either an area of the image and/or text indicating failed equipment). Failed image 718 contains an object 720 with an annotation 722 illustrating the failure of that particular image. It is to be appreciated the image retention user interface 700 is not limited to displaying failed images in thumbnails and/or a specific number of failed images. Furthermore, the image retention user interface 700 is capable of displaying images in a variety of formats (e.g., JPG, BMP, TIF, GIF, PDF, . . . ).

The image retention user interface 700 further provides inputs such as, for example buttons 706, 708, 712, 714, and a touchpad 710. It is to be appreciated the subject invention is not limited to these inputs, but are merely for example. The inputs can provide user interactions providing the selection, editing, transmitting, receiving, and viewing of the failed images. For instance, an input 706 allows a user to edit a failed image utilizing photo-editing techniques. Additionally, an input 708 allows a user to adjust equipment within a manufacturing line based upon the failed image. The input 708 can launch a menu that facilitates adjusting and/or correcting equipment. An input 712 can act as an enter button allowing the selection of certain actions within the display. An input 714 can provide the user a transmitting function wherein selected images can be sent to a remote location and/or system. In order to navigate within the display 704, a touchpad 710 can be used in conjunction with a wand and/or digit on a hand. However, the subject invention can utilize software and touch screen capabilities wherein buttons are not necessary. Moreover, it is to be appreciated the image retention interface 700 can utilize a menu function wherein settings and/or configurations for display can be tailored to a user.

Figure 8:
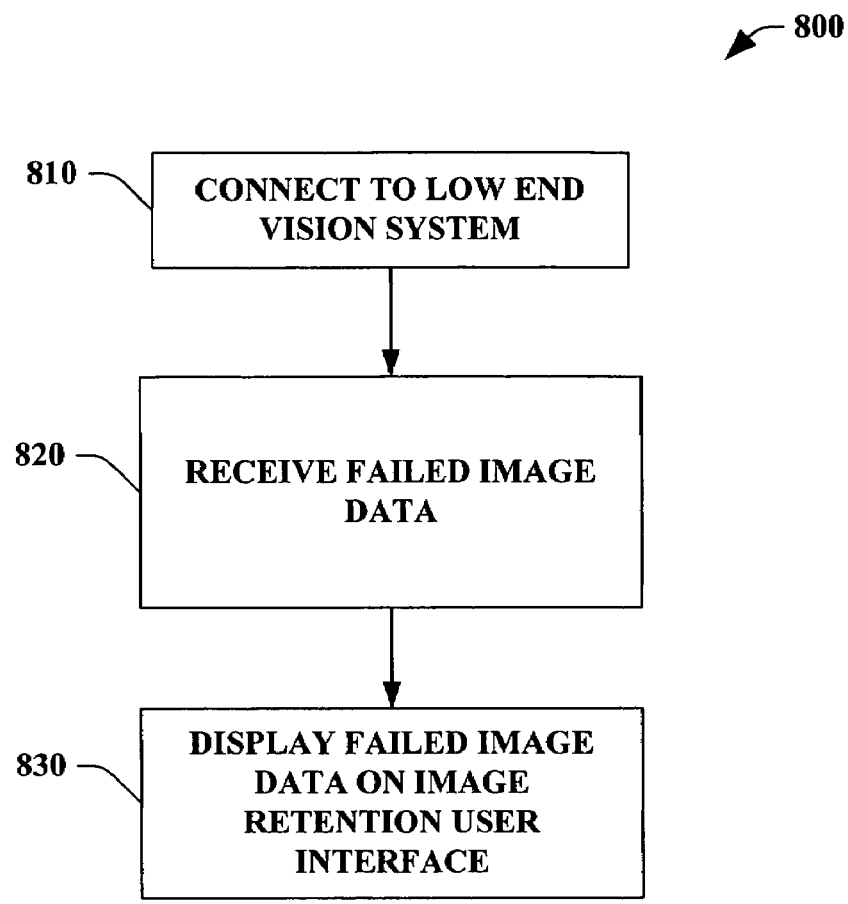
FIG. 8 illustrates a flow chart of an exemplary methodology that facilitates measuring and/or inspecting utilizing a user interface.
Figure 9:
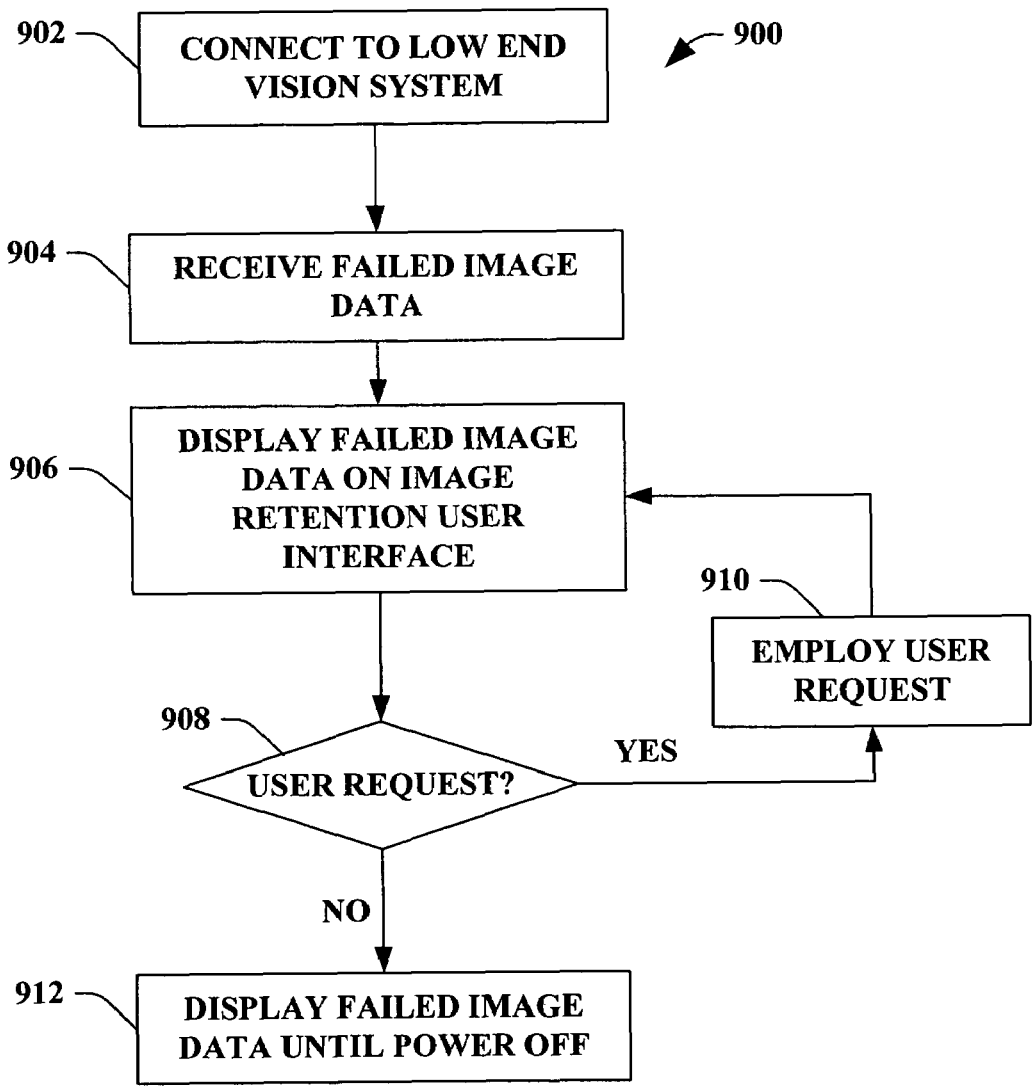
FIG. 9 illustrates a flow chart of an exemplary methodology that facilitates measuring and/or inspecting utilizing a user interface.

FIGS. 8-9 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that employs an image retention user interface to facilitate inspecting and/or measuring within a manufacturing line. At 810, there is a connection to a low end vision system. For instance, the image retention user interface can connect to a low end vision system utilizing a direct connection (e.g., hardwire, LAN cable, Firewire, USB cable, serial cable, . . . ) and/or wireless connection (e.g., Bluetooth, radio frequency, infrared, wireless LAN, wireless PAN, optical, cellular . . . ). After a connection to a trusted low end vision system is made, the image retention user interface receives failed image data consisting of at least one failed image at 820. It is to be appreciated the image retention user interface can either stay connected to the low end vision system and/or disconnect after receiving the necessary data. For example, the failed image data can be formatted in any suitable format (e.g., BMP, JPG, TIF, GIF, PDF, . . . ) to be displayed. Moreover, the failed image data can be thumbnails and associated larger images allowing a plurality of failed image data to be displayed. At 830, the image retention user interface can display the data to a user. It is to be appreciated the failed image data can be annotated informing the user of where a failure exists.

FIG. 9 illustrates a methodology 900 that employs an image retention user interface that facilitates measuring and/or inspecting within manufacturing lines containing a low end vision system. At 902, the image retention user interface connects to a low end vision system wherein data is collected containing at least a failed image. The connection made to the low end vision system can be, for example, a direct connection and/or a wireless connection. After establishing a secure connection to a secure low end vision system, failed image data is received by the image retention user interface at 904. It is to be appreciated the image retention user interface can either stay connected to the low end vision system and/or disconnect after receiving the necessary data.

Next at 906, the received failed image data is displayed on the image retention user interface. It is to be appreciated the failed image data can be, but not limited to, thumbnails, failed images, failed images with annotation, description information relating to a failed image, etc. At 908, the image retention user interface awaits a user request. If a user request is determined, the request is employed at 910. After employing the user request, the image retention user interface displays the failed image data accordingly. A user request can be, for example, transmitting a failed image, editing a failed image, adjusting equipment within the low end vision system, enlarging a failed image from a thumbnail, . . . . If no user request is made, the image retention user interface displays failed image data until powered off at 912.

Figure 10:
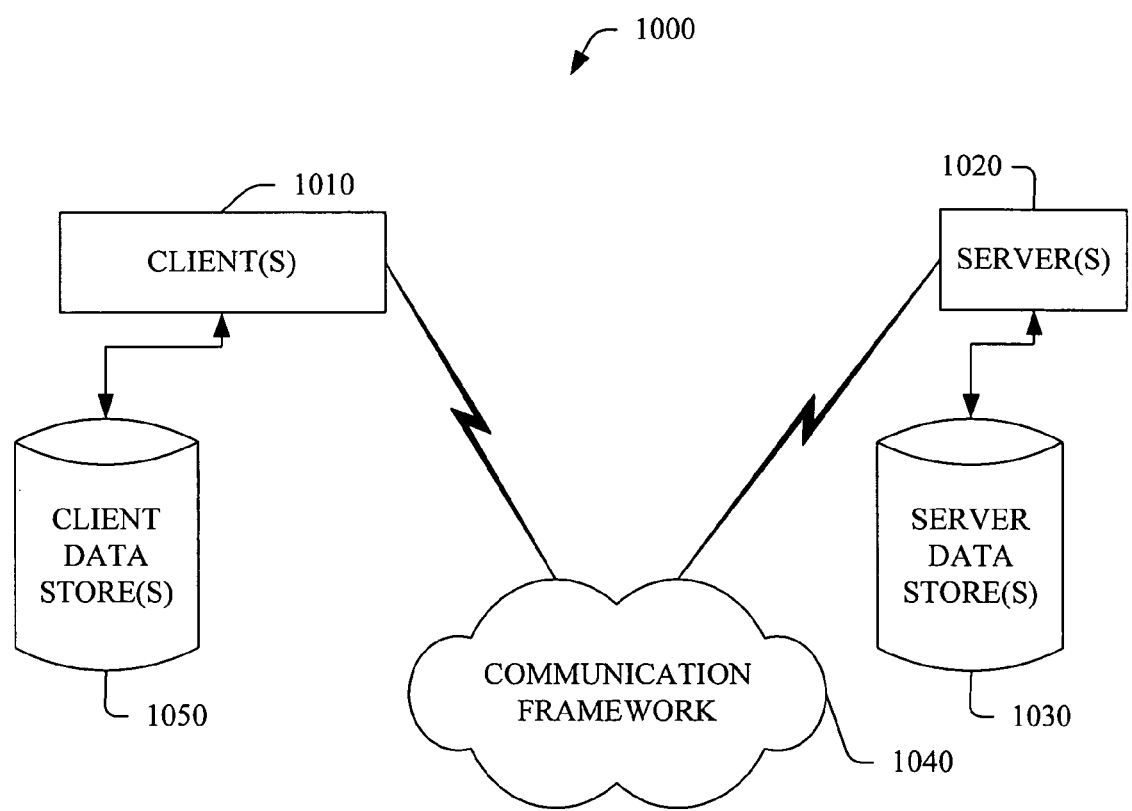
FIG. 10 illustrates an exemplary networking environment, wherein the novel aspects of the present invention can be employed.
Figure 11:
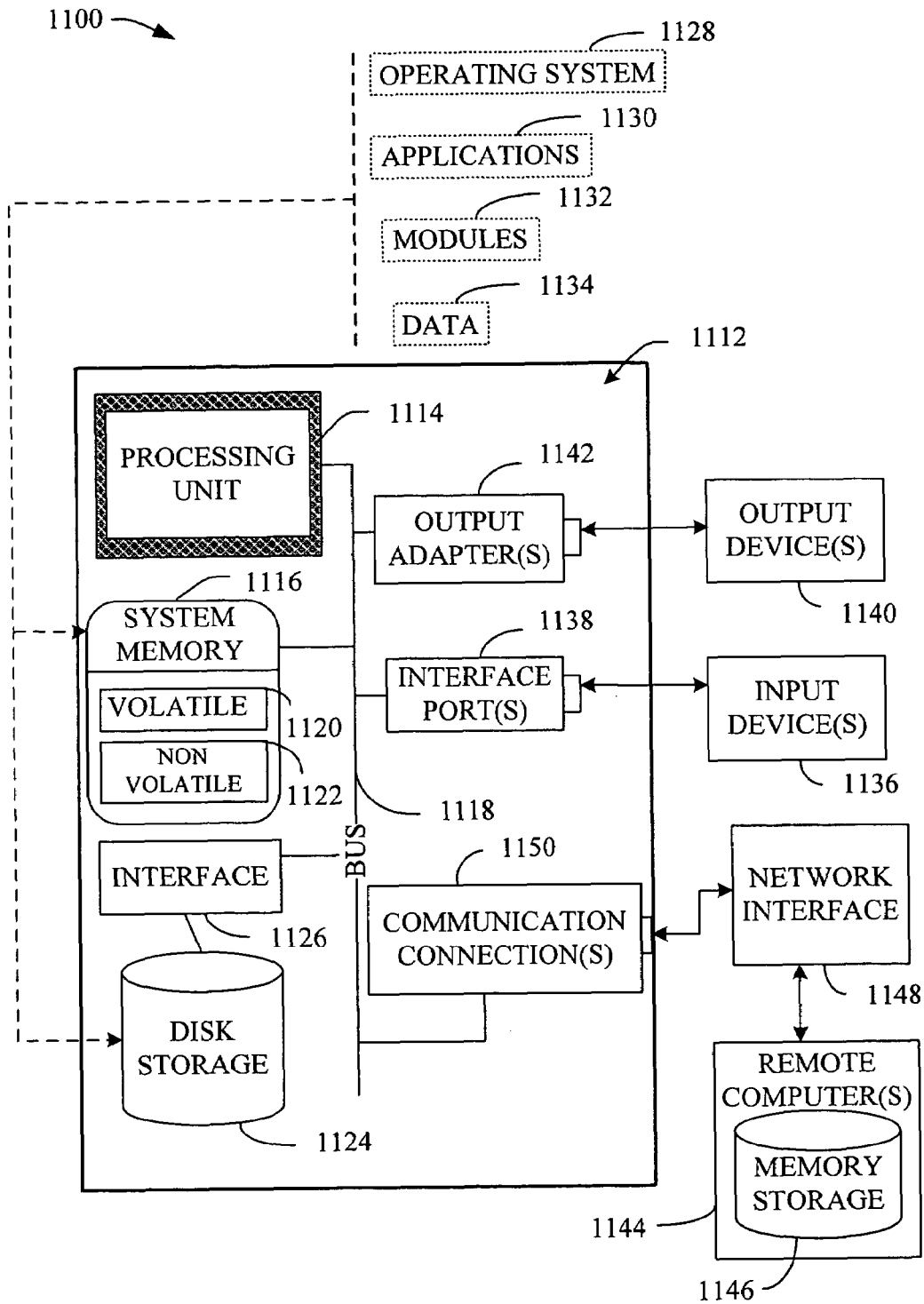
FIG. 11 illustrates an exemplary operating environment, wherein the novel aspects of the present invention can be employed.

In order to provide additional context for implementing various aspects of the present invention, FIGS. 10-11 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g. threads, processes, computing devices). The servers 1020 can house threads to perform transformations by employing the present invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates inspecting manufacturing lines, comprising:
    a component that receives a plurality of failed images relating to a manufacturing line, wherein a vision sensor in a low end vision system captures the failed images;
    an image retention user interface that displays thumbnails of the plurality of failed images, the thumbnails are displayed in a mixture comprising a plurality of image formats;
    an artificial intelligence component that infers adjustments to correct equipment associated with the manufacturing line based at least in part upon captured failed images; and
    an adjustment component that provides adjustments to correct equipment associated with the manufacturing line by increasing deceleration rate for the manufacturing line based at least upon the inferred adjustments.

2. The system of claim 1, further comprises an adjustment component that provides adjustments to correct equipment.

3. The system of claim 2, wherein the equipment is associated with a low end vision system.

4. The system of claim 3, wherein the adjustment component provides configuration and/or settings to be adjusted for equipments within the low end vision system.

5. The system of claim 3, wherein the adjustment component adjusts at least a lens focus based upon a user preference and/or determination in order to correct focus failure and to reduce failed images due to focus problem.

6. The system of claim 1, further comprises an editor component that utilizes an editing technique to edit a failed image selected from the plurality of the failed images.

7. The system of claim 1, wherein at least one failed image has an annotation that informs of where the failed image failed.

8. The system of claim 7, wherein the annotation is a text on the failed image.

9. The system of claim 7, wherein the annotation is a pictorial emphasis.

10. The system of claim 7, the annotation is provided to a user audibly.

11. The system of claim 1, further comprises a component that formats at least one of the failed images.

12. The system of claim 11, the format component converts a failed image stored in a first format to a second format based upon criteria associated with a user, the criteria being at least one of size, available memory, display and resolution.

13. The system of claim 1, further comprises an output component that transmits at least one of the failed images to a remote system.

14. The system of claim 13, wherein the remote system is one of: a cell phone; a personal computer; a pager; an email account; a web page; a portable digital assistant (PDA); a laptop; a wrist watch; and a second image retention user interface.

15. The system of claim 1, wherein the image retention user interface connects to the low end vision system via a wireless connection.

16. The system of claim 1, wherein the image retention user interface connects to the low end vision system via a direct connection.

17. The system of claim 1, wherein the image retention user interface is integrated into a vision sensor.

18. The system of claim 1, wherein the image retention user interface connects to a vision sensor via one of: a direct connection; and a wireless connection.

19. The system of claim 1, wherein the image retention user interface is one of: a laptop; a handheld; a cell phone; a portable digital assistant (PDA); a monitor with touch-screen technology; a pager; a wrist watch; and a portable gaming system.

20. The system of claim 1, wherein the image retention user interface formats at least one failed image in a suitable format for display thereon.

21. The system of claim 1, a thumbnail is selected for a larger view from the thumbnails of the plurality of failed images.

22. The system of claim 1, an artificial intelligence component utilizes at least one of historical data and user profiles in order to infer configurations and/or settings for the image retention user interface.

23. The system of claim 1, wherein the artificial intelligence component determines and implements a corrective brightness setting for the low end vision system based at least in part upon captured failed images.

24. A computer-implemented method that facilitates inspecting manufacturing lines, comprising:
    receiving a plurality of failed images relating to a manufacturing line;
    inferring an optimal encoding format for the failed image;
    formatting of the failed image for display;
    displaying thumbnails of the failed images in a plurality of formats on an image retention user interface, the failed images including annotations comprising at least a cause of a failure of captured failed image;
    correcting equipments associated with capturing failed images based on the cause of the failed images,
    said correcting comprising correcting equipments associated with the manufacturing line by increasing deceleration rate for the manufacturing line.

25. The method of claim 24, further comprises employing a user request.

26. The method of claim 25, wherein the user request is one of: transmitting a failed image; editing a failed image; adjusting equipment; and enlarging a failed image from a thumbnail.

27. A computer readable medium storing computer executable components that facilitates inspecting manufacturing lines, comprising:
    a component that receives a failed image relating to a manufacturing line, wherein a vision sensor in a low end vision system captures the failed images;
    an image retention user interface that displays the failed image in a plurality of image formats, comprising a JPG, a BMP, a TIF, a GIF and a PDF, the failed image including a name and a location of the manufacturing line wherein the vision sensors are utilized for inspection; and
    an artificial intelligence component that infers corrections and/or adjustments relating to the manufacturing line and associated low-end vision system based at least in part upon the captured failed images; and
    an adjustment component that provides adjustments to correct equipment associated with the manufacturing line and the low-end vision system, said adjustments comprising increasing deceleration rate for the manufacturing line based at least upon the inferred corrections and/or adjustments.

28. The computer readable medium of claim 27, further comprises:
    an image retention user interface that displays the failed image;
    an adjustment component that provides adjustments to correct equipment;
    an editor component that utilizes an editing technique to edit the failed image; and
    an output component that transmits the failed image to a remote system.

29. A computer implemented system that facilitates inspecting manufacturing lines, comprising:
    means for receiving a plurality of failed images relating to a manufacturing line;
    means for displaying thumbnails of the failed images on an image retention user interface in a mixture comprising multiple image formats, the multiple image formats comprising a JPG, a BMP, a TIF, a GIF and a PDF;
    means for inferring corrections and adjustments to equipment relating to manufacturing lines and associated low end vision system based at least in part upon received failed images; and
    means for correcting equipments associated with the manufacturing line by increasing deceleration rate for the manufacturing line in order to correct the failed images based at least upon the inferred corrections and adjustments.

30. The computer implemented system of claim 29, further comprises:
    means for adjusting equipment;
    means for transmitting at least one failed image;
    means for editing at least one failed image; and
    means for formatting at least one failed image.

* * * * *